United States Patent
Futae et al.

(10) Patent No.: US 10,641,330 B2
(45) Date of Patent: May 5, 2020

(54) BEARING DEVICE AND EXHAUST TURBINE SUPERCHARGER

(71) Applicant: MITSUBISHI HEAVY INDUSTRIES ENGINE & TURBOCHARGER, LTD., Sagamihara-shi, Kanagawa (JP)

(72) Inventors: Takaya Futae, Tokyo (JP); Takashi Nambu, Tokyo (JP); Tatsuya Ishizaki, Tokyo (JP); Seigi Yano, Tokyo (JP)

(73) Assignee: MITSUBISHI HEAVY INDUSTRIES ENGINE & TURBOCHARGER, LTD., Sagamihara-Shi (JP)

( * ) Notice: Subject to any disclaimer, the term of this patent is extended or adjusted under 35 U.S.C. 154(b) by 0 days.

(21) Appl. No.: 16/080,953

(22) PCT Filed: Mar. 1, 2016

(86) PCT No.: PCT/JP2016/056307
§ 371 (c)(1),
(2) Date: Aug. 29, 2018

(87) PCT Pub. No.: WO2017/149679
PCT Pub. Date: Sep. 8, 2017

(65) Prior Publication Data
US 2019/0063496 A1    Feb. 28, 2019

(51) Int. Cl.
*F16C 33/10* (2006.01)
*F16C 17/18* (2006.01)
(Continued)

(52) U.S. Cl.
CPC ............ *F16C 33/106* (2013.01); *F01D 25/16* (2013.01); *F01D 25/18* (2013.01); *F02B 39/00* (2013.01);
(Continued)

(58) Field of Classification Search
CPC ...... F16C 17/02; F16C 17/045; F16C 17/107; F16C 17/18; F16C 17/26; F16C 33/106; F16C 2360/24
See application file for complete search history.

(56) References Cited

U.S. PATENT DOCUMENTS 6,935,849 B2 *   8/2005   Gutknecht ............. F16C 17/04
                                                      384/138
9,222,366 B2 *  12/2015   Hornbach .............. F16C 17/18
                         (Continued)

FOREIGN PATENT DOCUMENTS

DE    10 2009 007696 A1    8/2010
DE       10200907696   *   8/2010
                     (Continued)

OTHER PUBLICATIONS

Translation of JP2013185443 obtained Jun. 26, 2019.*
(Continued)

*Primary Examiner* — James Pilkington
(74) *Attorney, Agent, or Firm* — Birch, Stewart, Kolasch & Birch, LLP

(57) ABSTRACT

Reduce bearing loss due to lubricating oil using a rotary shaft; a journal bearing that is provided to the rotary shaft and that rotatably supports the rotary shaft; a flange part having an opposing surface part that is arranged so as to oppose a side surface part of the journal bearing with a gap therebetween in the axial direction in which the rotary shaft extends; and a recess part provided in the side surface part or the opposing surface part. In the projected area of the journal bearing in the axial direction, the area of a section including the recess part and not forming the gap is larger than the area in which the side surface part and the opposing surface part form the gap.

4 Claims, 7 Drawing Sheets

(51) Int. Cl.
  *F16C 17/26* (2006.01)
  *F16C 17/02* (2006.01)
  *F16C 17/10* (2006.01)
  *F16C 17/04* (2006.01)
  *F02B 39/00* (2006.01)
  *F01D 25/16* (2006.01)
  *F01D 25/18* (2006.01)
  *F02C 6/12* (2006.01)

(52) U.S. Cl.
  CPC .............. *F02C 6/12* (2013.01); *F16C 17/18* (2013.01); *F16C 17/26* (2013.01); *F16C 17/02* (2013.01); *F16C 17/045* (2013.01); *F16C 17/107* (2013.01); *F16C 2360/24* (2013.01)

(56) References Cited

U.S. PATENT DOCUMENTS

| | | | |
|---|---|---|---|
| 9,638,059 B2 * | 5/2017 | Becker | F16C 17/26 |
| 9,726,189 B2 * | 8/2017 | Nishida | F16C 17/18 |
| 2017/0234213 A1 | 8/2017 | Futae et al. | |

FOREIGN PATENT DOCUMENTS

| | | | |
|---|---|---|---|
| JP | 11-2136 A | | 1/1999 |
| JP | 2001-140888 A | | 5/2001 |
| JP | 2005-155894 A | | 6/2005 |
| JP | 2012-92811 A | | 5/2012 |
| JP | 2013-185443 A | | 9/2013 |
| JP | 2013185443 | * | 9/2013 |
| JP | 2014-80890 A | | 5/2014 |
| WO | WO 2013/145078 A1 | | 10/2013 |
| WO | WO 2016/079781 A1 | | 5/2016 |

OTHER PUBLICATIONS

International Search Report and Written Opinion of the International Searching Authority dated May 31, 2016 issued in International Application No. PCT/JP2016/056307 with an English Translation.

Extended European Search Report dated Jan. 11, 2019 issued in corresponding European Patent Application No. 16892523.8.

Official Action dated Apr. 16, 2019 received in corresponding Japanese Patent Application No. 2018-502926 with an English Translation.

* cited by examiner

BEARING DEVICE AND EXHAUST TURBINE SUPERCHARGER

TECHNICAL FIELD

The present invention relates to a bearing device and an exhaust turbine turbocharger to which the bearing device is applied.

BACKGROUND ART

In the related art, for example, PTL 1 discloses a turbocharger. In the turbocharger, a rotating shaft is rotatably supported in a bearing housing by a journal bearing (bearing). An impeller is fitted to one end of the rotating shaft in a compressor housing and a turbine is fitted to the other end of the rotating shaft in a turbine housing. A thrust bush is fixed to the rotating shaft, and a thrust bearing is configured by a thrust disk which is fitted to the thrust bush and is fixed to the bearing housing so as not to be rotated. In addition, the above-described journal bearing and thrust bush are provided so as to face each other in an axial direction in which the rotating shaft extends. In addition, the bearing housing includes a passage which communicates with each of the journal bearing and the thrust bearing and is configured to supply a lubricating oil to each of the journal bearing and the thrust bearing via the passage.

CITATION LIST

Patent Literature

[PTL 1] Japanese Unexamined Patent Application Publication No. 11-2136

SUMMARY OF INVENTION

Technical Problem

Meanwhile, in recent years, according to a reduction in a size of an engine corresponding to the improvement of fuel consumption, a reduction in a size and high efficiency of an exhaust turbine turbocharger are required. In addition, in an output of the exhaust turbine turbocharger, a ratio of a bearing loss is high at a low speed region. Accordingly, decreasing the bearing loss is effective for achieving high efficiency at the low speed region. It is considered that the bearing loss at the low speed region is caused by a stirring resistance of the lubricating oil. Accordingly, it is preferable to decrease the bearing loss caused by the lubricating oil.

The present invention is made to solve the above-described problems, and an object thereof is to provide a bearing device and an exhaust turbine turbocharger capable of decreasing the bearing loss caused by the lubricating oil.

Solution to Problem

In order to achieve the above-described object, there is provided a bearing device including: a rotating shaft; a journal bearing which is provided on the rotating shaft to rotatably support the rotating shaft; a disk member having a facing portion which is disposed so as to face a side surface portion of the journal bearing with a gap therebetween in an axial direction in which the rotating shaft extends; and a recessed portion which is provided in the side surface portion or the facing portion, in which in a projected area of the journal bearing in the axial direction, an area of a portion which includes the recessed portion and does not form the gap is larger than an area which forms the gap by the side surface portion and the facing portion.

According to the bearing device, in the projected area in the axial direction, the area which includes the recessed portion and does not form the gap is larger than the area of the side surface portion which forms the gap, and thus, the lubricating oil is accommodated in the recessed portion. Accordingly, it is possible to decrease an amount of a lubricating oil staying the gap between the side surface portion of the journal bearing and the facing portion of the flange portion. Therefore, a stirring resistance of the lubricating oil in the gap portion decreases, and a bearing loss decreases. As a result, it is possible to improve the rotation efficiency of the rotating shaft.

In addition, in the bearing device of the present invention, the recessed portion may be formed by a notch which is continuously provided on a radially inner edge of the journal bearing in the side surface portion in a circumferential direction.

According to the bearing device, the recessed portion can be formed by the notch which is continuously provided on the radially inner edge of the journal bearing in the circumferential direction.

Moreover, in the bearing device of the present invention, the recessed portion may be formed by circumferentially disposing a plurality of grooves which are continuously provided in the facing portion in a radial direction.

According to this bearing device, the recessed portion can be formed by circumferentially disposing the plurality of grooves which are continuously provided in the facing portion in the radial direction.

Moreover, in the bearing device of the present invention, the recessed portion may be formed by a notch which is continuously provided on a radially outer edge of the disk member in the facing portion in a circumferential direction.

According to the bearing device, the recessed portion can be formed by the notch which is continuously provided on the radially outer edge of the disk member in the facing portion in the circumferential direction.

Moreover, in the bearing device of the present invention, the recessed portion is formed by a groove which is continuously provided in the side surface portion in a circumferential direction.

According to the bearing device, the recessed portion can be formed by the groove which is continuously provided in the side surface portion in the circumferential direction.

In order to achieve the above-described object, there is provided an exhaust turbine turbocharger including: a turbine; a compressor; a rotating shaft which coaxially connects the turbine and the compressor to each other; a housing in which the turbine, the compressor, and the rotating shaft are accommodated; a journal bearing which is provided on the rotating shaft, is accommodated in the housing, and rotatably supports the rotating shaft; a disk member which is provided on the rotating shaft and has a facing portion which is disposed so as to face a side surface portion of the journal bearing with a gap therebetween in an axial direction in which the rotating shaft extends; a recessed portion which is provided in the side surface portion or the facing portion; and any one of the above-described bearing device.

According to the exhaust turbine turbocharger, in the projected area in the axial direction, the area which includes the recessed portion and does not form the gap is larger than the area of the side surface portion which forms the gap, and thus, the lubricating oil is accommodated in the recessed portion. Accordingly, it is possible to decrease an amount of the lubricating oil staying the gap between the side surface portion of the journal bearing and the facing portion of the flange portion. Therefore, a stirring resistance of the lubricating oil in the gap portion decreases, and a bearing loss decreases. As a result, rotation efficiency of the rotating shaft is improved, and it is possible to improve efficiency of the exhaust turbine turbocharger. Moreover, a space for accommodating the lubricating oil is not provided on the housing side, and thus, a reduction in a size of the exhaust turbine turbocharger can be maintained.

Advantageous Effects of Invention

According to the present invention, it is possible to decrease a bearing loss caused by the lubricating oil.

DESCRIPTION OF EMBODIMENTS

Hereinafter, an embodiment according to the present invention will be described in detail with reference to the drawings. In addition, the present invention is not limited by the embodiment. In addition, constituent elements in the following embodiment include constituent elements which can be easily replaced by those skilled in the art or constituent elements which are substantially the same.

Figure 1:
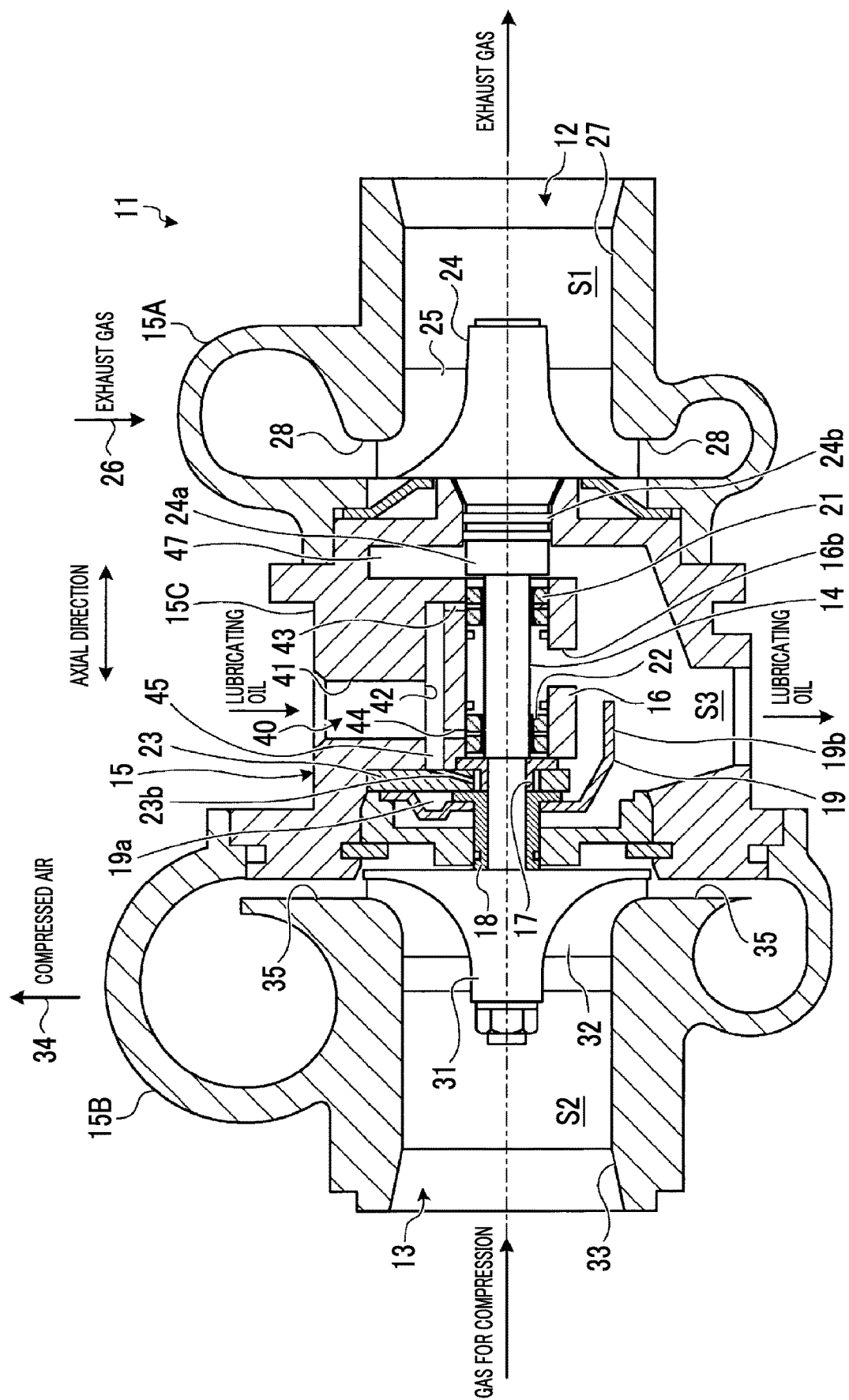
FIG. 1 is an overall configuration view of an exhaust turbine turbocharger according to an embodiment of the present invention.
Figure 2:
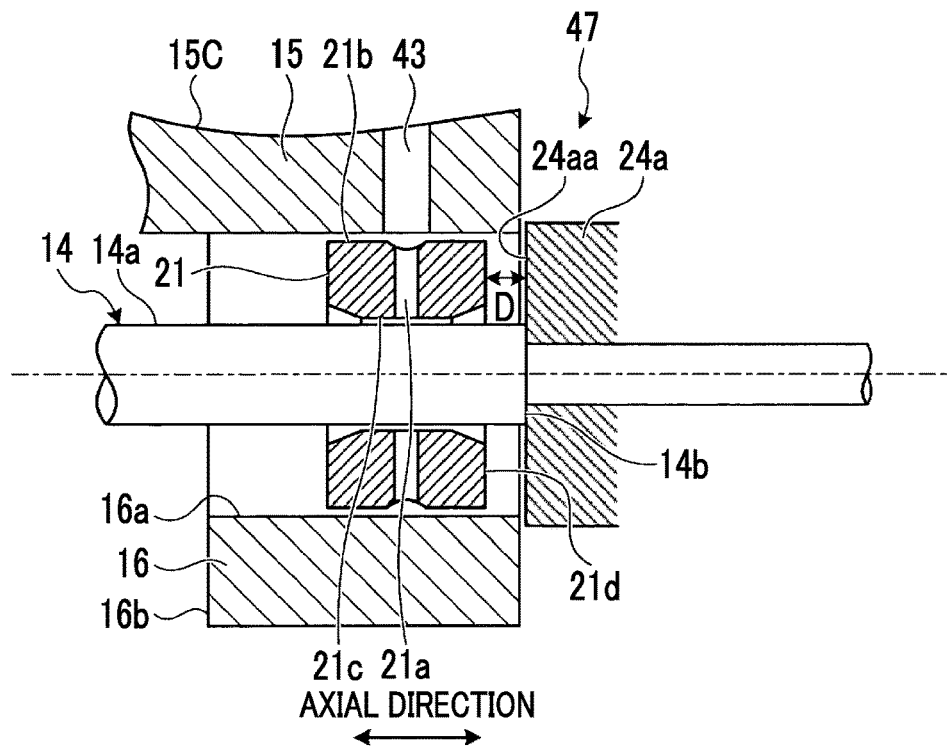
FIG. 2 is an enlarged view of a bearing portion of the exhaust turbine turbocharger according to the embodiment of the present invention.
Figure 3:
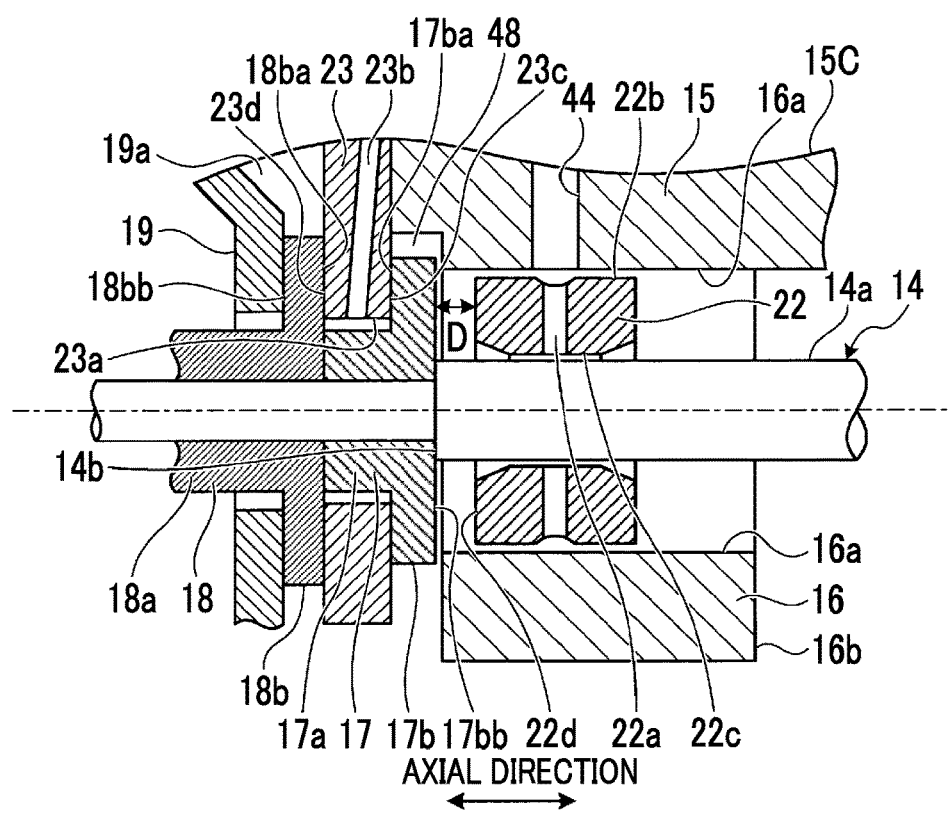
FIG. 3 is an enlarged view of the bearing portion of the exhaust turbine turbocharger according to the embodiment of the present invention.

FIG. 1 is an overall configuration view of an exhaust turbine turbocharger according to the present embodiment. FIG. 2 is an enlarged view of a bearing portion of the exhaust turbine turbocharger according to the present embodiment. FIG. 3 is an enlarged view of the bearing portion of the exhaust turbine turbocharger according to the present embodiment.

An exhaust turbine turbocharger 11 shown in FIG. 1 mainly includes a turbine 12, a compressor 13, and a rotating shaft 14, and these are accommodated in a housing 15.

An inside of the housing 15 is formed in a hollow shape, and the housing 15 includes a turbine housing 15A forming a first space portion S1 in which a configuration of the turbine 12 is accommodated, a compressor cover 15B forming a second space portion S2 in which a configuration of the compressor 13 is accommodated, and a bearing housing 15C forming a third space portion S3 in which the rotating shaft 14 is accommodated. The third space portion S3 of the bearing housing 15C is positioned between the first space portion S1 of the turbine housing 15A and the second space portion S2 of the compressor cover 15B.

In the rotating shaft 14, an end portion on the turbine 12 side is rotatably supported by a journal bearing 21 which is a turbine-side bearing, an end portion on the compressor 13 side is rotatably supported by a journal bearing 22 which is a compressor-side bearing, and a movement of the rotating shaft 14 in an axial direction in which the rotating shaft 14 extends is regulated by a thrust bearing 23. In addition, a turbine disk 24 of the turbine 12 is fixed to one end portion of the rotating shaft 14 in the axial direction. The turbine disk 24 is accommodated in the first space portion S1 of the turbine housing 15A, and a plurality of turbine blades 25 forming an axial flow type are provided on an outer peripheral portion of the turbine disk 24 with a predetermined gap therebetween in a circumferential direction. In addition, a compressor impeller 31 of the compressor 13 is fixed to the other end portion of the rotating shaft 14 in the axial direction, the compressor impeller 31 is accommodated in the second space portion S2 of the compressor cover 15B, and a plurality of blades 32 are provided on an outer peripheral portion of the compressor impeller 31 with a predetermined gap therebetween in the circumferential direction.

Moreover, the turbine housing 15A includes an inlet passage 26 of an exhaust gas and an outlet passage 27 of the exhaust gas with respect to the turbine blades 25. In addition, in the turbine housing 15A, a turbine nozzle 28 is provided between the inlet passage 26 and the turbine blades 25, an axial exhaust gas flow which is statically pressure-expanded by the turbine nozzle 28 is led to the plurality of turbine blades 25 by the turbine nozzle 28, and thus, the turbine 12 can be rotationally driven. In addition, the compressor cover 15B includes an air intake port 33 and a compressed air discharge port 34 with respect to the compressor impeller 31. In addition, in the compressor cover 15B, a diffuser 35 is provided between the compressor impeller 31 and the compressed air discharge port 34. Air compressed by the compressor impeller 31 is discharged through the diffuser 35.

In the exhaust turbine turbocharger 11 configured as described above, the turbine 12 is driven by an exhaust gas discharged from an engine (not shown), a rotation of the turbine 12 is transmitted to the rotating shaft 14 to drive the compressor 13, and the compressor 13 compresses a combustion gas to supply the compressed combustion gas to the engine. Accordingly, the exhaust gas from the engine passes through the inlet passage 26 of the exhaust gas and is statically pressure-expanded by the turbine nozzle 28, and the axial exhaust gas flow is led to the plurality of turbine blades 25. Therefore, the turbine 12 is rotationally driven via the turbine disk 24 to which the plurality of turbine blades 25 are fixed. In addition, the exhaust gas which drives the plurality of turbine blades 25 is discharged to the outside from the outlet passage 27. Meanwhile, if the rotating shaft 14 is rotated by the turbine 12, and the integral compressor impeller 31 is rotated, and air is sucked through the air intake port 33. The sucked air is compressed by the compressor impeller 31 and becomes compressed air, and the compressed air is supplied from the compressed air discharge port 34 to the engine through the diffuser 35.

In addition, in the exhaust turbine turbocharger 11, a lubricating oil supply passage 40 through which a lubricating oil is supplied to the journal bearings 21 and and the thrust bearing 23 is provided in the bearing housing 15C. The lubricating oil supply passage 40 includes a first supply passage 41 formed in a radial direction on an upper portion of the bearing housing 15C, a second supply passage 42 formed in the axial direction on the upper portion of the bearing housing 15C, a third supply passage 43 which communicates with the journal bearing 21, a fourth supply passage 44 which communicates with the journal bearing 22, and a fifth supply passage 45 which communicates with the thrust bearing 23. A base end portion of the first supply passage 41 is connected to a lubricating oil tank (not shown), and a tip end portion thereof is connected to an intermediate portion of the second supply passage 42. A base end portion of the third supply passage 43 communicates with the second supply passage 42 and a tip end portion thereof communicates with the journal bearing 21. A base end portion of the fourth supply passage 44 communicates with the second supply passage 42 and a tip end portion thereof communicates with the journal bearing 22. A base end portion of the fifth supply passage 45 communicates with the second supply passage 42 and a tip end portion thereof communicates with the thrust bearing 23.

As shown in FIGS. 1 to 3, each of the journal bearings 21 and 22 is formed in a cylindrical shape. The journal bearings 21 and 22 are accommodated in a columnar space which is formed by a support portion 16 provided in the third space portion S3 in the bearing housing 15C. In the support portion 16 supporting the respective journal bearings 21 and 22, a passage 16b leading to a lower portion of the third space portion S3 between the journal bearings 21 and 22 is formed.

As shown in FIG. 2, the journal bearing 21 is rotatably supported between an outer peripheral surface 21b and an inner surface 16a of the support portion 16, and the journal bearing 21 rotatably supports the rotating shaft 14 between an inner peripheral surface 21c and an outer peripheral surface 14a of the rotating shaft 14. In the journal bearing 21, the tip end portion of the third supply passage 43 communicates with the outer peripheral surface 21b. In addition, in the journal bearing 21, a passage 21a penetrating the journal bearing 21 from the outer peripheral surface 21b to the inner peripheral surface 21c is formed, and the lubricating oil supplied from the third supply passage 43 to the outer peripheral surface 21b is led to a portion between the inner peripheral surface 21c and the outer peripheral surface 14a of the rotating shaft 14 through the passage 21a. Accordingly, the journal bearing 21 is rotatably supported by the support portion 16 using the lubricating oil supplied to the portion between the outer peripheral surface 21b and the inner surface 16a of the support portion 16, and the journal bearing 21 rotatably supports the rotating shaft 14 by the lubricating oil supplied to a portion between the inner peripheral surface 21c and the outer peripheral surface 14a of the rotating shaft 14.

Here, as shown in FIG. 1, the turbine disk 24 of the turbine 12 includes a boss portion 24a protruding to the compressor 13 side such that the turbine disk 24 is disposed to be adjacent to the journal bearing 21 in the axial direction. The boss portion 24a is formed in a cylindrical shape, is fitted to a portion in which an end portion of the rotating shaft 14 on the turbine 12 side is formed in a small diameter via a step portion 14b, and abuts against the step portion 14b to be positioned in the axial direction. As shown in FIG. 2, the portion of the boss portion 24a abutting against the step portion 14b is a disk member which covers an opening of a columnar space on the turbine 12 side formed by the support portion 16, and the boss portion 24a includes a facing portion 24aa which is disposed so as to face the side surface portion 21d of the journal bearing 21 with a gap D therebetween in the axial direction. In addition, in the bearing housing 15C, an oil discharge space chamber 47 is formed on an outer peripheral portion of the boss portion 24a. Moreover, in the turbine disk 24 of the turbine 12, a seal portion 24b is formed between the boss portion 24a and the turbine disk 24 in the axial direction. The seal portion 24b forms a seal portion with the bearing housing 15C.

In the journal bearing 21, the lubricating oil supplied to the outer peripheral surface 21b side and the inner peripheral surface 21c side flows from the passage 16b of the support portion 16 toward a lower portion of the third space portion S3 on the compressor 13 side. Meanwhile, in the journal bearing 21, the lubricating oil supplied to the outer peripheral surface 21b side and the inner peripheral surface 21c side flows to the side surface portion 21d side on the turbine 12 side, is fed to a radially outer side by a centrifugal force of the rotation of the rotating shaft 14 in the facing portion 24aa of the facing boss portion 24a so as to reach the oil discharge space chamber 47 on an outer peripheral portion of the boss portion 24a, and flows from the oil discharge space chamber 47 to the lower portion of the third space portion S3.

As shown in FIG. 3, the journal bearing 22 is rotatably supported between the outer peripheral surface 22b and the inner surface 16a of the support portion 16, and the journal bearing 22 rotatably supports the rotating shaft 14 between an inner peripheral surface 22c and the outer peripheral surface 14a of the rotating shaft 14. In the journal bearing 22, the tip end portion of the fourth supply passage 44 communicates with the outer peripheral surface 22b. In addition, in the journal bearing 22, a passage 22a penetrating the journal bearing 22 from the outer peripheral surface 22b to the inner peripheral surface 22c is formed, and the lubricating oil supplied from the fourth supply passage 44 to the outer peripheral surface 22b is led to a portion between the inner peripheral surface 22c and the outer peripheral surface 14a of the rotating shaft 14 through the passage 22a. Accordingly, the journal bearing 22 is rotatably supported by the support portion 16 using the lubricating oil supplied to the portion between the outer peripheral surface 22b and the inner surface 16a of the support portion 16, and the journal bearing 22 rotatably supports the rotating shaft 14 by the lubricating oil supplied to a portion between the inner peripheral surface 22c and the outer peripheral surface 14a of the rotating shaft 14.

As shown in FIG. 1, the thrust bearing 23 is disposed on the compressor 13 side to be adjacent to the journal bearing 22 in the axial direction of the rotating shaft 14. As shown in FIG. 3, the thrust bearing 23 is formed in a plate shape having an insertion hole 23a into which the rotating shaft 14 is inserted and is fixed to the bearing housing 15C. The thrust bearing 23 regulates an axial movement of the rotating shaft 14 via a thrust ring 17 and a thrust sleeve 18.

As shown in FIG. 3, the thrust ring 17 includes a boss portion 17a and a flange portion 17b. The boss portion 17a is formed in a cylindrical shape, is fitted to a portion in which an end portion of the rotating shaft 14 on the compressor 13 side is formed in a small diameter via the step portion 14b, abuts against the step portion 14b to be positioned in the axial direction, and is inserted into the insertion hole 23a of the thrust bearing 23 along with the rotating shaft 14. The flange portion 17b is a disk member which protrudes radially outward from a portion of the boss portion 17a abutting against the step portion 14b, and includes one facing portion 17ba disposed to face a plate surface 23c of the thrust bearing 23 on the journal bearing 22 side in the axial direction and the other facing portion 17bb disposed to face the side surface portion 22d of the journal bearing 22 with the gap D therebetween in the axial direction.

As shown in FIG. 3, the thrust sleeve 18 includes a boss portion 18a and a flange portion 18b. The boss portion 18a is formed in a cylindrical shape, is fitted to a portion which is formed in a small diameter on the end portion of the rotating shaft 14 on the compressor 13 side, and abuts against the end surface of the boss portion 17a on the compressor 13 side in the thrust ring 17 to be positioned in the axial direction. The flange portion 18b is a disk member which protrudes radially outward from a portion of the boss portion 18a abutting against the boss portion 17a of the thrust ring 17, and includes one facing portion 18ba which is disposed to face a plate surface 23d of the thrust bearing 23 on the compressor 13 side in the axial direction and the other facing portion 18bb which is disposed to face an oil storage portion 19 forming an oil storage space 19a from the compressor 13 side toward the thrust bearing 23 side in the axial direction. In the oil storage portion 19, a lower portion of the oil storage space 19a is open downward, and the oil storage portion 19 is formed to communicate with the lower portion of the third space portion S3.

That is, each of the thrust ring 17 and the thrust sleeve 18 is disposed such that the thrust bearing 23 is interposed between the facing portions 17ba and 18ba positioned one side of the flange portions 17b and 18b. Accordingly, the thrust bearing 23 regulates the axial movement of the rotating shaft 14 via the thrust ring 17 and the thrust sleeve 18.

In addition, a passage 23b is formed in the thrust bearing 23. A base end portion of the passage 23b communicates with the tip end portion of the fifth supply passage 45, and a tip end portion thereof communicates with the insertion hole 23a. Accordingly, the lubricating oil supplied from the fifth supply passage 45 to the insertion hole 23a via the passage 23b, and is led to portions between the respective plate surfaces 23c and 23d of the thrust bearing 23 and the respective facing portions 17ba and 18ba of the flange portions 17b and 18b. Accordingly, the thrust bearing 23 decreases a friction resistance between the facing portions 17ba and 18ba by the lubricating oil supplied to the portion between the respective facing portions 17ba and 18ba of the flange portions 17b and 18b while regulating the axial movement of the rotating shaft 14 between the facing portions 17ba and 18ba.

In the thrust bearing 23, on the facing portion 18ba side of the flange portion 18b of the thrust sleeve 18, the lubricating oil is fed to the radially outer side by the centrifugal force of the rotation of the rotating shaft 14, a portion of the lubricating oil flows to the lower portion of the third space portion S3 on the lower side of the flange portion 18b along an outer peripheral portion of the flange portion 18b, and a portion of the lubricating oil reaches the oil storage space 19a of the oil storage portion 19. The oil storage portion 19 includes a tongue piece 19b which extends from the lower side of the oil storage portion 19, and the oil storage space 19a is formed around the rotating shaft 14 and communicates with the lower portion of the third space portion S3 via the tongue piece 19b. Accordingly, the lubricating oil which has reached the oil storage space 19a flows to the lower portion of the third space portion S3 along the tongue piece 19b. Meanwhile, on the facing portion 17ba side of the flange portion 17b of the thrust ring 17, the lubricating oil is fed to the radially outer side by the centrifugal force of the rotation of the rotating shaft 14. A clearance 48 is formed between the outer peripheral portion of the flange portion 17b and the bearing housing 15C, and the clearance 48 communicates with the lower portion of the third space portion. Accordingly, the lubricating oil fed to the radially outer side on the facing portion 17ba side flows to the lower portion of the third space portion S3 through the clearance 48.

In addition, the journal bearing 22 adjacent to the thrust bearing 23, the lubricating oil supplied to the outer peripheral surface 22b side and the inner peripheral surface 22c side flows from the passage 16b of the support portion 16 to the lower portion of the third space portion S3 on the turbine 12 side. Meanwhile, in the journal bearing 22 adjacent to the thrust bearing 23, the lubricating oil supplied to the outer peripheral surface 22b side and the inner peripheral surface 22c side flows to the side surface portion 22d side on the thrust bearing side, is fed to the radially outer side by the centrifugal force of the rotation of the rotating shaft 14 in the facing portion 17bb of the flange portion 17b of the facing thrust ring 17, and flows to the lower portion of the third space portion S3 through the clearance 48.

In addition, although it is not shown in the drawings, in the bearing housing 15C of the housing 15, the base end portion of the lubricating oil discharge pipe is connected to the lower portion of the third space portion S3. A tip end portion of the lubricating oil discharge pipe is connected to an oil pan. The oil pan is connected to the lubricating oil tank, which is connected to first supply passage 41 of the lubricating oil supply passage 40, via a lubricating oil circulation line. An oil pump and an oil filter are interposed in the lubricating oil circulation line, and the lubricating oil of which impurities are filtered by the oil filter is fed from the oil pan to the lubricating oil tank via the lubricating oil circulation line by the oil pump. In addition, the lubricating oil is supplied from the lubricating oil tank to the first supply passage 41.

Hereinafter, a bearing device according to the present embodiment will be described with reference to FIGS. 4 to 13. As described above, the bearing device of the present embodiment relates to the side surface portions 21d and 22d of the journal bearings 21 and 22, the other facing portion 17bb of the flange portion (disk member) 17b in the thrust ring 17 of the thrust bearing 23 adjacent to the journal bearing 22 in the axial direction, or the facing portion 24aa of the boss portion (disk member) 24a in the turbine disk 24 of the turbine 12 adjacent to the journal bearing 21 in the axial direction.

Figure 4:
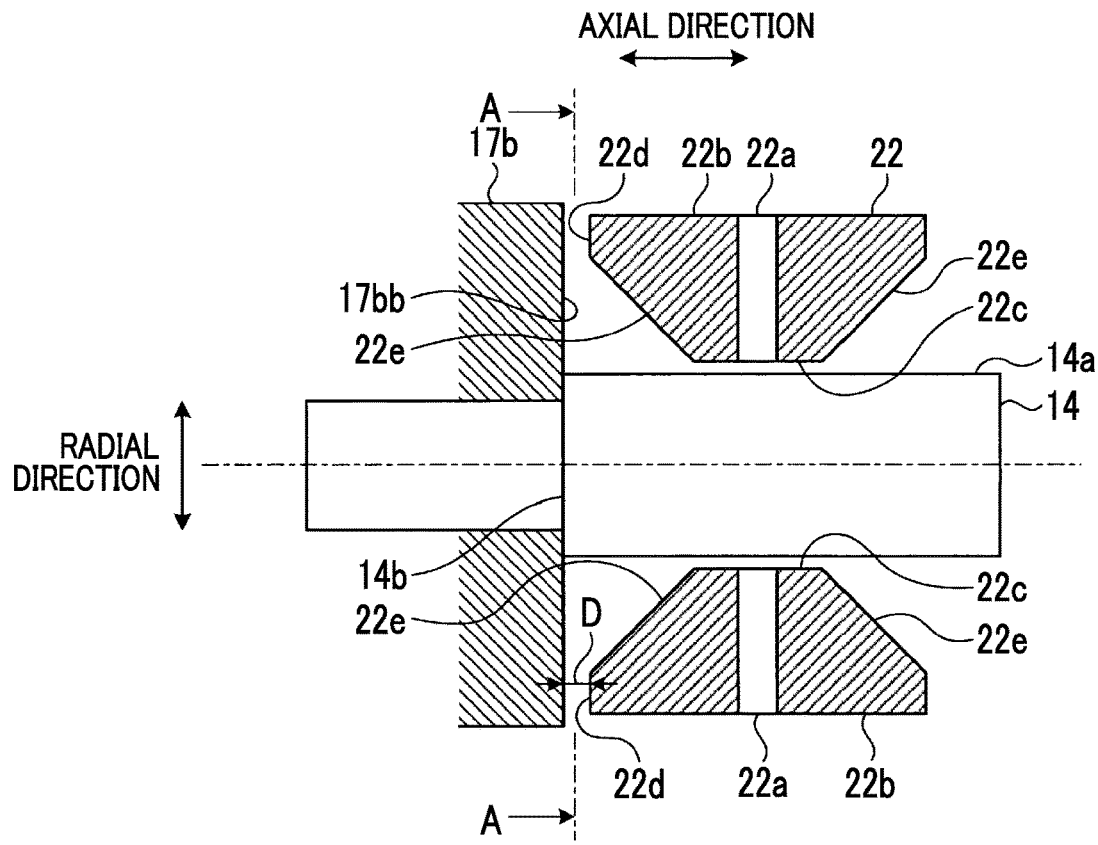
FIG. 4 is an enlarged view showing an example of a bearing device according to the embodiment of the present invention.
Figure 5:
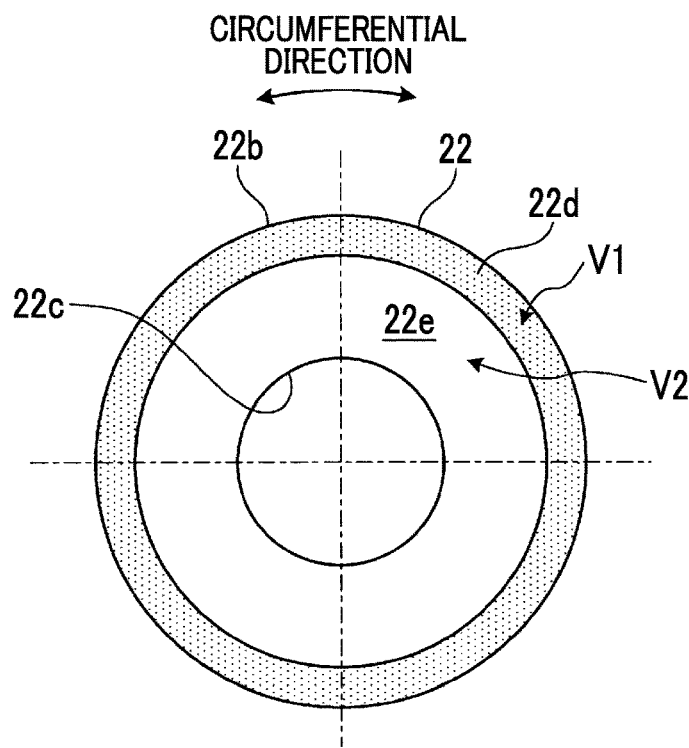
FIG. 5 is a sectional view taken along line A-A in FIG. 4.

FIG. 4 is an enlarged view showing an example of the bearing device according to the present embodiment. FIG. 5 is a sectional view taken along line A-A in FIG. 4.

As shown in FIG. 4, the side surface portion 22d of the journal bearing 22 facing the thrust bearing 23 side in the axial direction and the other facing portion 17bb of the flange portion (disk member) 17b in the thrust ring 17 of the thrust bearing 23 face each other in the axial direction and are disposed with the gap D therebetween. In addition, in the journal bearing 22, a recessed portion 22e is formed on the side surface portion 22d. As shown in FIG. 4, the recessed portion 22e is a notch which is provided to be continuous in the circumferential direction and to be cut out in a triangular shape obliquely in the radial direction and the axial direction on the radially inner edge of the journal bearing 22 in the side surface portion 22*d*. In addition, although it is not shown in the drawings, the recessed portion 22*e* may be formed by a notch which is provided to be continuous in the circumferential direction and to be cut out in a rectangular shape in the radial direction and the axial direction on the radially inner edge of the journal bearing 22 in the side surface portion 22*d*. In addition, although it is not shown in the drawings, the recessed portion 22*e* may be a plurality of grooves which are intermittently provided in the circumferential direction on the radially inner edge of the journal bearing 22 in the side surface portion 22*d*. By the recessed portion 22*e* formed in this way, a dimension between the journal bearing 22 and the flange portion 17*b* is larger than the portion of the gap D.

In addition, as shown in FIG. 5, in a projected area (an area between the outer peripheral surface 22*b* and the inner peripheral surface 22*c* of the journal bearing 22) of the journal bearing 22 in the axial direction, an area V2 which includes the recessed portion 22*e*, does not form the gap D, and does not include the shaded portion in FIG. 5 is larger than an area V1 of the side surface portion 22*d* forming the gap D shown by the shaded portion in FIG. 5.

As described above, as shown in FIG. 3, in the journal bearing 22, on the thrust bearing 23 side, the lubricating oil supplied to the outer peripheral surface 22*b* side and the inner peripheral surface 22*c* side flows to the side surface portion 22*d* side, is fed to the radially outer side by the centrifugal force of the rotation of the rotating shaft 14 on the facing portion 17*bb* facing the side surface portion 22*d*, and flows to the lower portion of the third space portion S3 through the clearance 48. However, in a case where the clearance 48 is filled with the lubricating oil, the lubricating oil stays in the portion of the gap D, and thus, a bearing loss is generated by a stirring resistance of the staying lubricating oil, rotation efficiency of the rotating shaft decreases, and efficiency of the exhaust turbine turbocharger 11 decreases.

With respect to the problems, according to the bearing device of the present embodiment, in the projected area in the axial direction, the area V2 which includes the recessed portion 22*e* and does not form the gap D is larger than the area V1 of the side surface portion 22*d* which forms the gap D, and thus, the lubricating oil is accommodated in the recessed portion 22*e*. Accordingly, it is possible to decrease an amount of the lubricating oil staying the gap D between the side surface portion 22*d* of the journal bearing 22 and the facing portion 17*bb* of the flange portion 17*b*. Therefore, the stirring resistance of the lubricating oil in the gap D portion decreases, and the bearing loss decreases. As a result, the rotation efficiency of the rotating shaft 14 is improved, and it is possible to improve the efficiency of the exhaust turbine turbocharger 11. Moreover, a space for accommodating the lubricating oil is not provided on the housing 15 side, and thus, a reduction in a size of the exhaust turbine turbocharger 11 can be maintained.

Moreover, as shown in FIG. 4, the recessed portions 22*e* are formed to be similar to each other on both side surface portions of the journal bearing 22 in the axial direction. Accordingly, the recessed portions 22*e* have a symmetrical shape, which facilitates manufacturing and contributes to an improvement in assimilability that eliminates a mistake in orientation at the time of assembly.

In addition, in the descriptions with reference to FIGS. 4 and 5, the example is described in which the recessed portion 22*e* is formed on the side surface portion 22*d* of the journal bearing 22. However, the present invention is not limited to this. For example, although it is not shown in the drawings, a recessed portion may be similarly formed on the side surface portion 21*d* of the journal bearing 21 facing the turbine 12 side in the axial direction.

Figure 6:
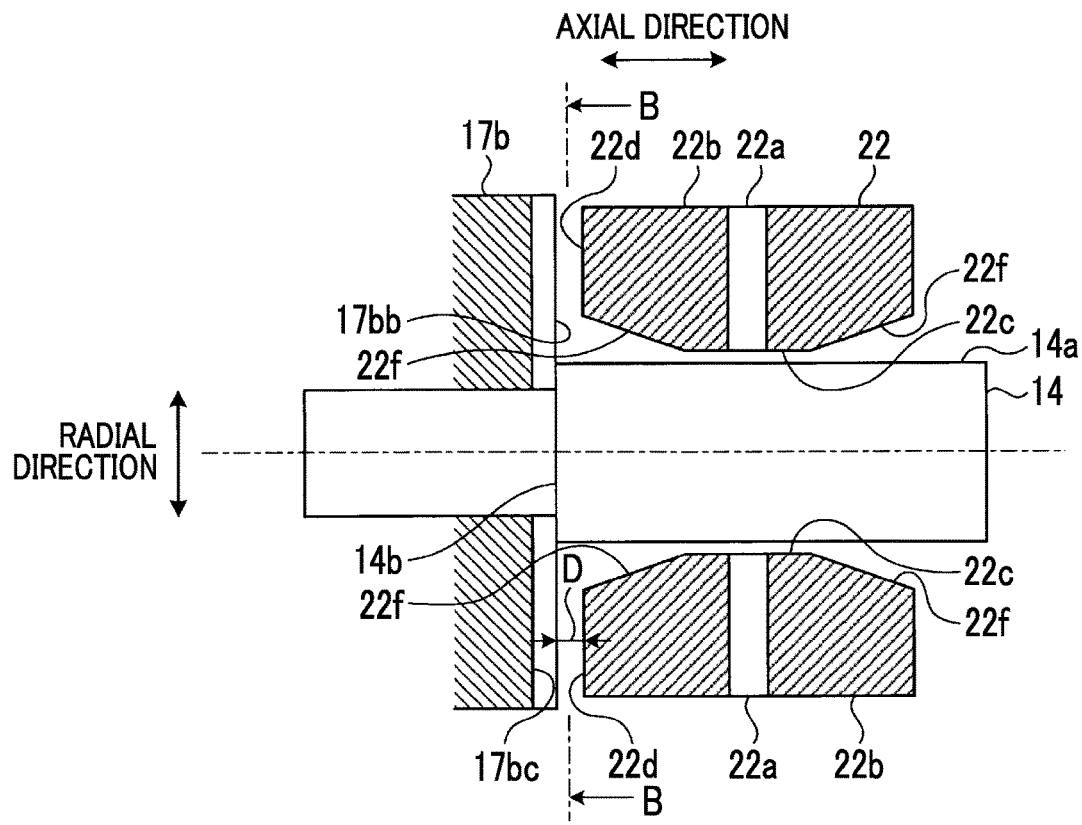
FIG. 6 is an enlarged view showing an example of the bearing device according to the embodiment of the present invention.
Figure 7:
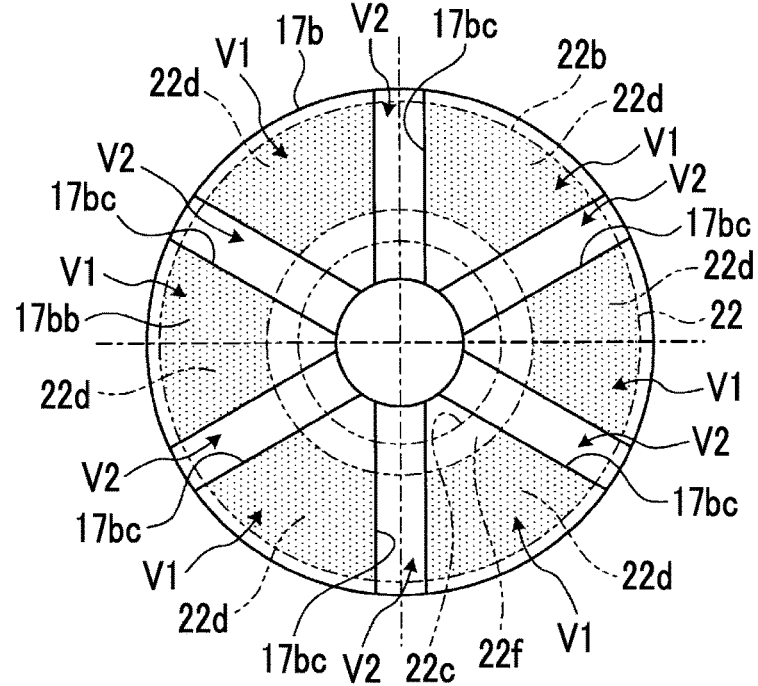
FIG. 7 is a sectional view taken along line B-B in FIG. 6.

FIG. 6 is an enlarged view showing an example of the bearing device according to the present embodiment. FIG. 7 is a sectional view taken along line B-B in FIG. 6.

As shown in FIG. 6, the side surface portion 22*d* of the journal bearing 22 facing the thrust bearing 23 side in the axial direction and the other facing portion 17*bb* of the flange portion (disk member) 17*b* in the thrust ring 17 of the thrust bearing 23 face each other in the axial direction and are disposed with the gap D therebetween. In addition, in the thrust ring 17, a recessed portion 17*bc* is formed on the facing portion 17*bb* of the flange portion 17*b*. As shown in FIGS. 6 and 7, the recessed portion 17*bc* is formed by a plurality of grooves which are continuous in the radial direction of the flange portion 17*b* in the facing portion 17*bb* and are provided to be arranged in the circumferential direction. In addition, a sectional shape of each groove forming the recessed portion 17*bc* may be various shapes such as a rectangular shape, a triangular shape, or a semicircular shape. By the recessed portion 17*bc* formed in this way, a dimension between the journal bearing 22 and the flange portion 17*b* is larger than the portion of the gap D. In addition, in FIG. 6, in the journal bearing 22, a notch 22*f* is formed, which is provided to be continuous in the circumferential direction and to be cut out in a triangular shape obliquely in the radial direction and the axial direction on the radially inner edge of the journal bearing 22 in the side surface portion 22*d*.

In addition, as shown in FIG. 7, in a projected area (an area between the outer peripheral surface 22*b* and the inner peripheral surface 22*c* of the journal bearing 22 shown by two-dot chain lines) of the journal bearing 22 in the axial direction, an area V2 which includes the recessed portion 17*bc* (notch 22*f*), does not form the gap D, and does not include the shaded portion in FIG. 7 is larger than an area V1 of the side surface portion 22*d* forming the gap D shown by the shaded portion in FIG. 7.

As described above, as shown in FIG. 3, in the journal bearing 22, on the thrust bearing 23 side, the lubricating oil supplied to the outer peripheral surface 22*b* side and the inner peripheral surface 22*c* side flows to the side surface portion 22*d* side, is fed to the radially outer side by the centrifugal force of the rotation of the rotating shaft 14 on the facing portion 17*bb* facing the side surface portion 22*d*, and flows to the lower portion of the third space portion S3 through the clearance 48. However, in the case where the clearance 48 is filled with the lubricating oil, the lubricating oil stays in the portion of the gap D, and thus, a bearing loss is generated by a stirring resistance of the staying lubricating oil, the rotation efficiency of the rotating shaft 14 decreases, and the efficiency of the exhaust turbine turbocharger 11 decreases.

With respect to the problems, according to the bearing device of the present embodiment, in the projected area in the axial direction, the area V2 which includes the recessed portion 17*bc* (notch 22*f*) and does not form the gap D is larger than the area V1 of the side surface portion 22*d* which forms the gap D, and thus, the lubricating oil is accommodated in the recessed portion 17*bc*. Accordingly, it is possible to decrease an amount of the lubricating oil staying the gap D between the side surface portion 22*d* of the journal bearing 22 and the facing portion 17*bb* of the flange portion 17*b*. Therefore, the stirring resistance of the lubricating oil in the gap D portion decreases, and the bearing loss decreases. As a result, the rotation efficiency of the rotating shaft 14 is improved, and it is possible to improve the efficiency of the exhaust turbine turbocharger 11. Moreover, a space for accommodating the lubricating oil is not provided on the housing 15 side, and thus, a reduction in a size of the exhaust turbine turbocharger 11 can be maintained.

In addition, in the descriptions with reference to FIGS. 6 and 7, the example is shown in which the recessed portion 17bc is formed on the other facing portion 17bb of the flange portion (disk member) 17b in the thrust ring 17 of the thrust bearing 23. However, the present invention is not limited to this. For example, although it is not shown in the drawings, a similar recessed portion may be formed on the facing portion 24aa of the boss portion (disk member) 24a facing the side surface portion 21d of the journal bearing 21.

Figure 8:
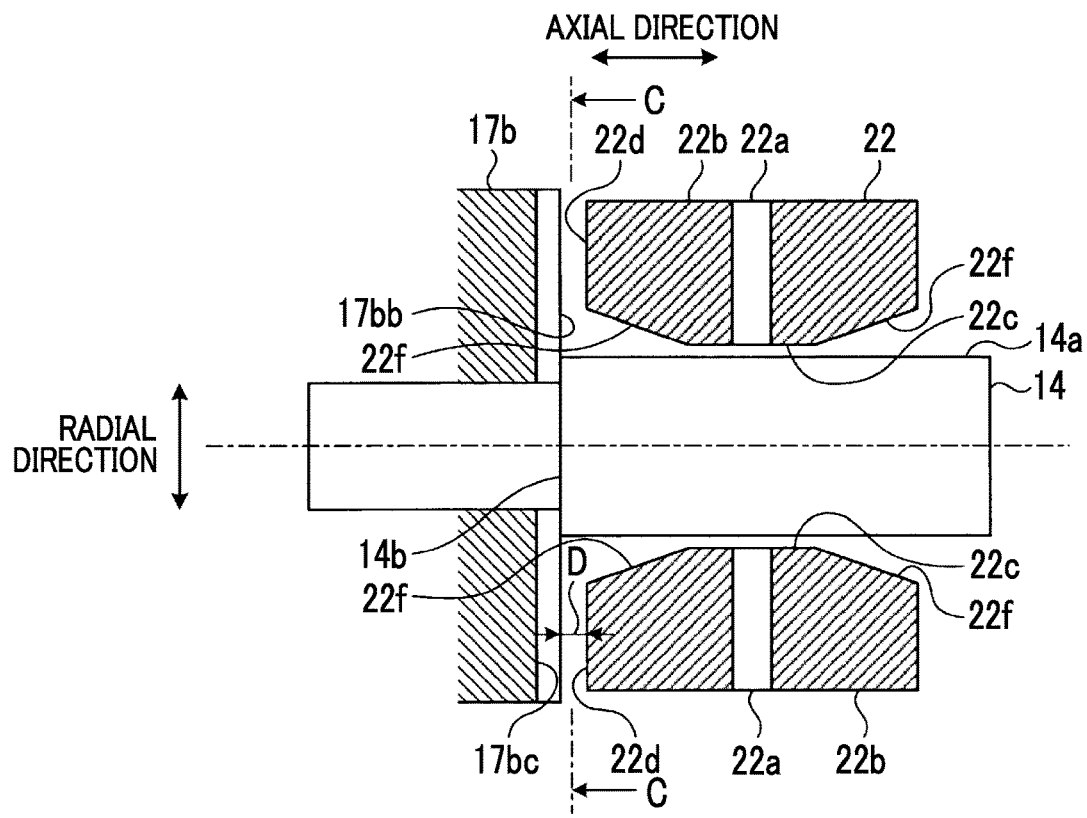
FIG. 8 is an enlarged view showing an example of the bearing device according to the embodiment of the present invention.
Figure 9:
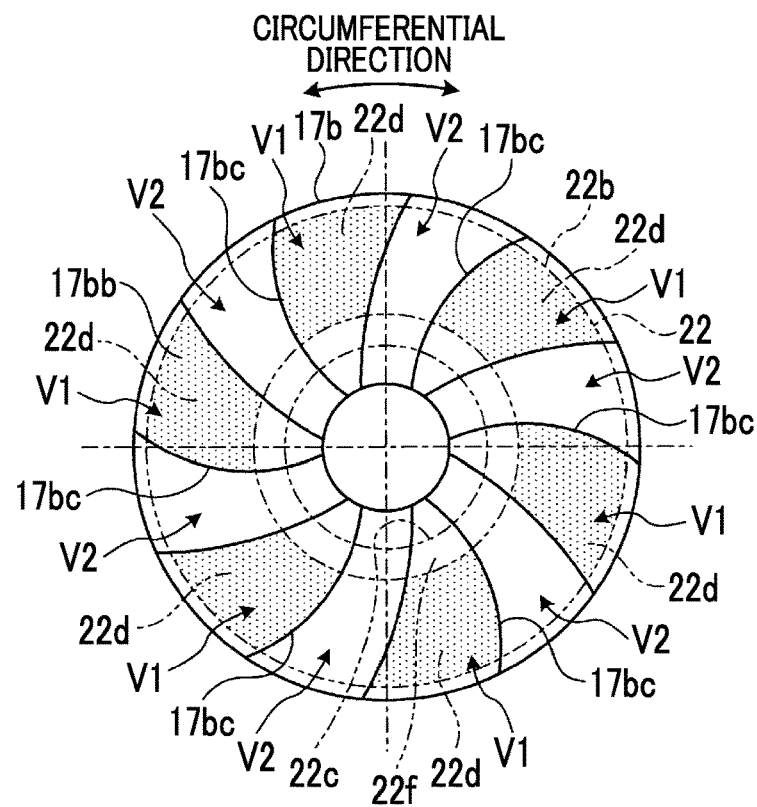
FIG. 9 is a sectional view taken along line C-C in FIG. 8.

FIG. 8 is an enlarged view showing an example of the bearing device according to the present embodiment. FIG. 9 is a sectional view taken along line C-C in FIG. 8.

In the bearing device shown in FIGS. 8 and 9, the grooves forming the recessed portion 17bc of the above-described bearing device shown in FIGS. 6 and 7 are formed to be curved in the circumferential direction.

That is, as shown in FIG. 8, the side surface portion 22d of the journal bearing 22 facing the thrust bearing 23 side in the axial direction and the other facing portion 17bb of the flange portion (disk member) 17b in the thrust ring 17 of the thrust bearing 23 face each other in the axial direction and are disposed with the gap D therebetween. In addition, in the thrust ring 17, a recessed portion 17bc is formed on the facing portion 17bb of the flange portion 17b. As shown in FIGS. 8 and 9, the recessed portion 17bc is formed by a plurality of grooves which are circumferentially curved whiling being continuous in the radial direction of the flange portion 17b in the facing portion 17bb and are provided to be arranged in the circumferential direction. In addition, a sectional shape of each groove forming the recessed portion 17bc may be various shapes such as a rectangular shape, a triangular shape, or a semi-circular shape. By the recessed portion 17bc formed in this way, a dimension between the journal bearing 22 and the flange portion 17b is larger than the portion of the gap D. In addition, in FIG. 8, in the journal bearing 22, a notch 22f is formed, which is provided to be continuous in the circumferential direction and to be cut out in a triangular shape obliquely in the radial direction and the axial direction on the radially inner edge of the journal bearing 22 in the side surface portion 22d.

In addition, as shown in FIG. 9, in a projected area (an area between the outer peripheral surface 22b and the inner peripheral surface 22c of the journal bearing 22 shown by two-dot chain lines) of the journal bearing 22 in the axial direction, the area V2 which includes the recessed portion 17bc (notch 22f), does not form the gap D, and does not include the shaded portion in FIG. 9 is larger than the area V1 of the side surface portion 22d forming the gap D shown by the shaded portion in FIG. 9.

As described above, as shown in FIG. 3, in the journal bearing 22, on the thrust bearing 23 side, the lubricating oil supplied to the outer peripheral surface 22b side and the inner peripheral surface 22c side flows to the side surface portion 22d side, is fed to the radially outer side by the centrifugal force of the rotation of the rotating shaft 14 on the facing portion 17bb facing the side surface portion 22d, and flows to the lower portion of the third space portion S3 through the clearance 48. However, in the case where the clearance 48 is filled with the lubricating oil, the lubricating oil stays in the portion of the gap D, and thus, a bearing loss is generated by a stirring resistance of the staying lubricating oil, the rotation efficiency of the rotating shaft 14 decreases, and the efficiency of the exhaust turbine turbocharger 11 decreases.

With respect to the problems, according to the bearing device of the present embodiment, in the projected area in the axial direction, the area V2 which includes the recessed portion 17bc (notch 22f) and does not form the gap D is larger than the area V1 of the side surface portion 22d which forms the gap D, and thus, the lubricating oil is accommodated in the recessed portion 17bc. Accordingly, it is possible to decrease an amount of the lubricating oil staying the gap D between the side surface portion 22d of the journal bearing 22 and the facing portion 17bb of the flange portion 17b. Therefore, the stirring resistance of the lubricating oil in the gap D portion decreases, and the bearing loss decreases. As a result, the rotation efficiency of the rotating shaft 14 is improved, and it is possible to improve the efficiency of the exhaust turbine turbocharger 11. Moreover, a space for accommodating the lubricating oil is not provided on the housing 15 side, and thus, a reduction in a size of the exhaust turbine turbocharger 11 can be maintained.

In addition, in the descriptions with reference to FIGS. 8 and 9, the example is shown in which the recessed portion 17bc is formed on the other facing portion 17bb of the flange portion (disk member) 17b in the thrust ring 17 of the thrust bearing 23. However, the present invention is not limited to this. For example, although it is not shown in the drawings, a similar recessed portion may be formed on the facing portion 24aa of the boss portion (disk member) 24a facing the side surface portion 21d of the journal bearing 21.

Figure 10:
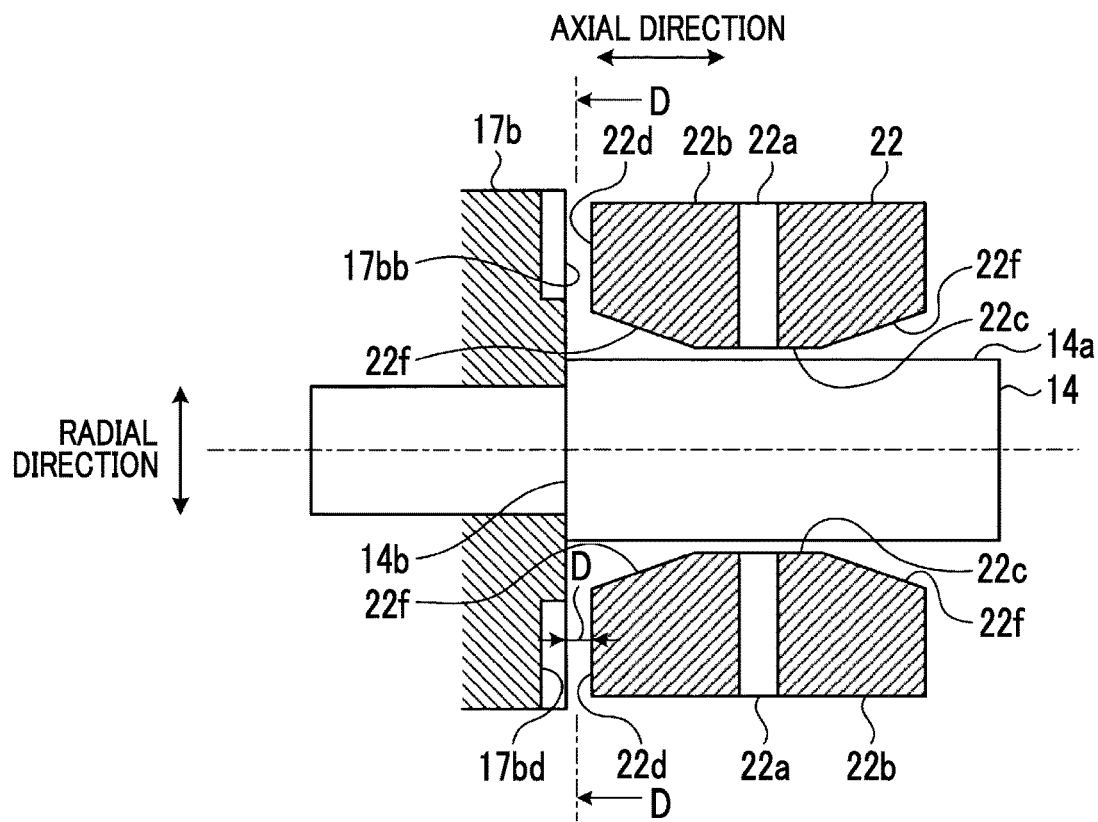
FIG. 10 is an enlarged view showing an example of the bearing device according to the embodiment of the present invention.
Figure 11:
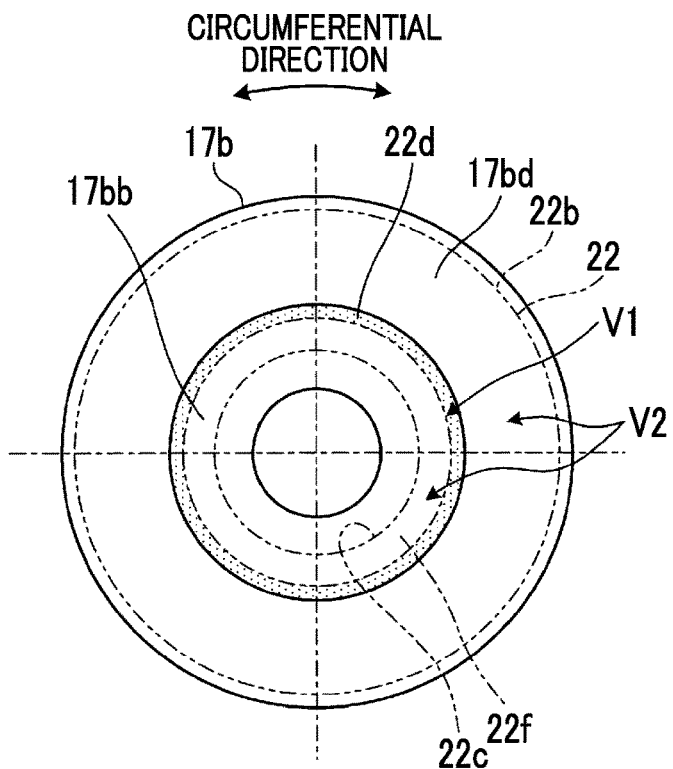
FIG. 11 is a sectional view taken along line D-D in FIG. 10.

FIG. 10 is an enlarged view showing an example of the bearing device according to the present embodiment. FIG. 11 is a sectional view taken along line D-D in FIG. 10.

As shown in FIG. 10, the side surface portion 22d of the journal bearing 22 facing the thrust bearing 23 side in the axial direction and the other facing portion 17bb of the flange portion (disk member) 17b in the thrust ring 17 of the thrust bearing 23 face each other in the axial direction and are disposed with the gap D therebetween. In addition, in the thrust ring 17, a recessed portion 17bd is formed on the facing portion 17bb of the flange portion 17b. As shown in FIGS. 10 and 11, the recessed portion 17bd is formed by an annular notch which is provided to be continuous in the circumferential direction while being open to a radially outer edge of the flange portion 17b in the facing portion 17bb. In addition, a bottom surface shape of the notch forming the recessed portion 17bd may be various shapes such as a flat rectangular shape, a curve shape, an uneven shape. By the recessed portion 17bd formed in this way, a dimension between the journal bearing 22 and the flange portion 17b is larger than the portion of the gap D. In addition, in FIG. 10, in the journal bearing 22, a notch 22f is formed, which is provided to be continuous in the circumferential direction and to be cut out in a triangular shape obliquely in the radial direction and the axial direction on the radially inner edge of the journal bearing 22 in the side surface portion 22d.

In addition, as shown in FIG. 11, in a projected area (an area between the outer peripheral surface 22b and the inner peripheral surface 22c of the journal bearing 22 shown by two-dot chain lines) of the journal bearing 22 in the axial direction, an area V2 which includes the recessed portion 17bd (notch 22f), does not form the gap D, and does not include the shaded portion in FIG. 11 is larger than the area V1 of the side surface portion 22d forming the gap D shown by the shaded portion in FIG. 11.

As described above, as shown in FIG. 3, in the journal bearing 22, on the thrust bearing 23 side, the lubricating oil supplied to the outer peripheral surface 22b side and the inner peripheral surface 22c side flows to the side surface portion 22d side, is fed to the radially outer side by the centrifugal force of the rotation of the rotating shaft 14 on the facing portion 17bb facing the side surface portion 22d, and flows to the lower portion of the third space portion S3 through the clearance 48. However, in the case where the clearance 48 is filled with the lubricating oil, the lubricating oil stays in the portion of the gap D, and thus, a bearing loss is generated by a stirring resistance of the staying lubricating oil, the rotation efficiency of the rotating shaft 14 decreases, and the efficiency of the exhaust turbine turbocharger 11 decreases.

With respect to the problems, according to the bearing device of the present embodiment, in the projected area in the axial direction, the area V2 which includes the recessed portion 17bd (notch 22f) and does not form the gap D is larger than the area V1 of the side surface portion 22d which forms the gap D, and thus, the lubricating oil is accommodated in the recessed portion 17bd. Accordingly, it is possible to decrease the amount of the lubricating oil staying the gap D between the side surface portion 22d of the journal bearing 22 and the facing portion 17bb of the flange portion 17b. Therefore, the stirring resistance of the lubricating oil in the gap D portion decreases, and the bearing loss decreases. As a result, the rotation efficiency of the rotating shaft 14 is improved, and it is possible to improve the efficiency of the exhaust turbine turbocharger 11. Moreover, a space for accommodating the lubricating oil is not provided on the housing 15 side, and thus, a reduction in a size of the exhaust turbine turbocharger 11 can be maintained.

In addition, in the descriptions with reference to FIGS. 10 and 11, the example is shown in which the recessed portion 17bd is formed on the other facing portion 17bb of the flange portion (disk member) 17b in the thrust ring 17 of the thrust bearing 23. However, the present invention is not limited to this. For example, although it is not shown in the drawings, a similar recessed portion may be formed on the facing portion 24aa of the boss portion (disk member) 24a facing the side surface portion 21d of the journal bearing 21.

Figure 12:
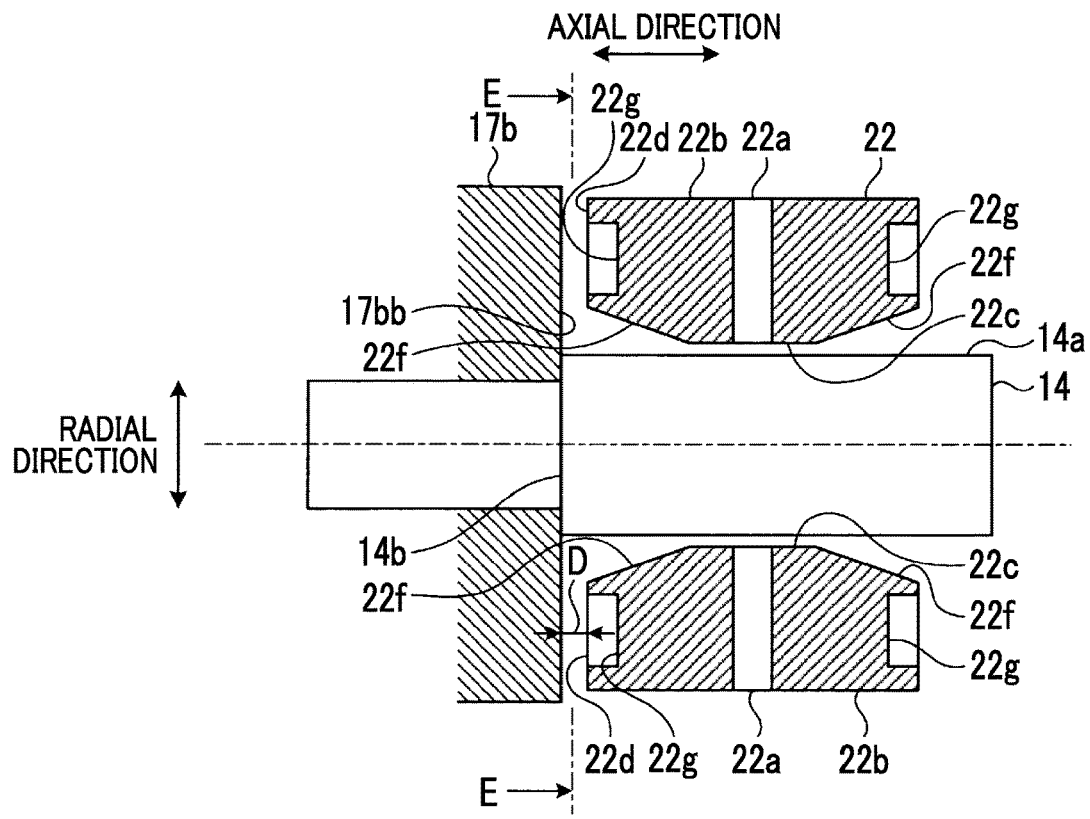
FIG. 12 is an enlarged view showing an example of the bearing device according to the embodiment of the present invention.
Figure 13:
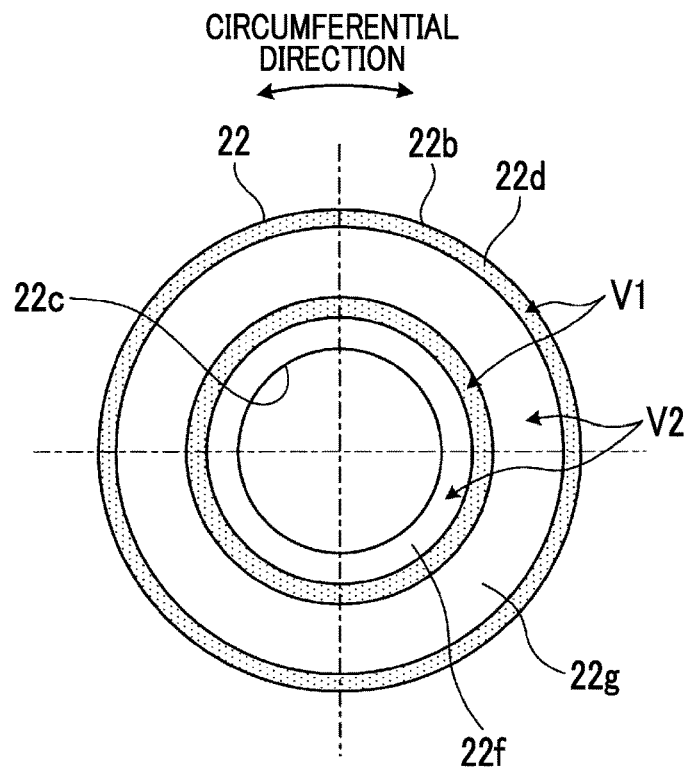
FIG. 13 is a sectional view taken along line E-E in FIG. 12.

FIG. 12 is an enlarged view showing an example of the bearing device according to the present embodiment. FIG. 13 is a sectional view taken along line E-E in FIG. 12.

As shown in FIG. 12, the side surface portion 22d of the journal bearing 22 facing the thrust bearing 23 side in the axial direction and the other facing portion 17bb of the flange portion (disk member) 17b in the thrust ring 17 of the thrust bearing 23 face each other in the axial direction and are disposed with the gap D therebetween. In addition, in the journal bearing 22, a recessed portion is 22g formed on the side surface portion 22d as well as the notch 22f so that the combination of the recessed portion 22g and the notch 22f is referred to as a recessed portion. As shown in FIGS. 12 and 13, the recessed portion 22g is formed an annular groove which is formed to be continuous in the circumferential direction in an intermediate portion of the side surface portion 22d in the radial direction. In other words the journal bearing 22 may have a recessed portion including the notch 22f and the groove (22g). In addition, in the recessed portion 22g, although it is not shown, a plurality of annular grooves may be provided in the radial direction, By the recessed portion 22g formed in this way, a dimension between the journal bearing 22 and the flange portion 17b is larger than the portion of the gap D.

In addition, as shown in FIG. 13, in a projected area (an area between the outer peripheral surface 22h and the inner peripheral surface 22c of the journal bearing 22) of the journal bearing 22 in the axial direction, the area V2 which includes the recessed portion 22g and the notch 22f, does not form the gap D, and does not include the shaded portion in FIG. 13 is larger than the area V1 of the side surface portion 22d forming the gap D shown by the shaded portion in FIG. 13.

As described above, as shown in FIG. 3, in the journal bearing 22, on the thrust bearing 23 side, the lubricating oil supplied to the outer peripheral surface 22b side and the inner peripheral surface 22c side flows to the side surface portion 22d side, is fed to the radially outer side by the centrifugal force of the rotation of the rotating shaft 14 on the facing portion 17bb facing the side surface portion 22d, and flows to the lower portion of the third space portion S3 through the clearance 48. However, in the case where the clearance 48 is filled with the lubricating oil, the lubricating oil stays in the portion of the gap D, and thus, a bearing loss is generated by a stirring resistance of the staying lubricating oil, the rotation efficiency of the rotating shaft 14 decreases, and the efficiency of the exhaust turbine turbocharger 11 decreases.

With respect to the problems, according to the bearing device of the present embodiment, in the projected area in the axial direction, the area V2 which includes the recessed portion 22g (notch 22f) and does not form the gap D is larger than the area V1 of the side surface portion 22d which forms the gap D, and thus, the lubricating oil is accommodated in the recessed portion 22g. Accordingly, it is possible to decrease an amount of the lubricating oil staying the gap D between the side surface portion 22d of the journal bearing 22 and the facing portion 17bb of the flange portion 17b. Therefore, the stirring resistance of the lubricating oil in the gap D portion decreases, and the bearing loss decreases. As a result, the rotation efficiency of the rotating shaft 14 is improved, and it is possible to improve the efficiency of the exhaust turbine turbocharger 11. Moreover, a space for accommodating the lubricating oil is not provided on the housing 15 side, and thus, a reduction in a size of the exhaust turbine turbocharger 11 can be maintained.

Moreover, as shown in FIG. 12, the recessed portions 22g are formed to be similar to each other on both side surface portions of the journal bearing 22 in the axial direction. Accordingly, the recessed portions 22g have a symmetrical shape, which facilitates manufacturing and contributes to an improvement in assimilability that eliminates a mistake in orientation at the time of assembly.

In addition, in the descriptions with reference to FIGS. 12 and 13, the example is described in which the recessed portion 22g is formed on the side surface portion 22d of the journal bearing 22. However, the present invention is not limited to this. For example, although it is not shown in the drawings, a recessed portion may be similarly formed on the side surface portion 21d of the journal bearing 21 facing the turbine 12 side in the axial direction.

The invention claimed is:

1. A bearing device comprising:
   a rotating shaft;
   a journal bearing which is provided on the rotating shaft to rotatably support the rotating shaft, the journal bearing having an end face, the end face having a side surface portion and a notch, the notch being provided to be continuous in a circumferential direction and to be cut out in a triangular shape obliquely in a radial direction and an axial direction in which the rotating shaft extends, on a radially inner edge of the journal bearing; and a disk member having a facing portion which is disposed so as to face the end face of the journal bearing so that a fixed gap is formed between the facing portion and the side surface portion in the axial direction wherein in a projected area of the journal bearing in the axial direction, an area obtained when the notch is projected onto the facing portion of the disk member is larger than an area obtained when the side surface portion is projected onto the facing portion.

2. The bearing device according to claim 1, wherein the journal bearing further has a groove at the end face, the groove being continuously provided in the side surface portion in a circumferential direction.

3. An exhaust turbine turbocharger comprising:
a bearing device according to claim 2;
a turbine;
a compressor coaxially connected to the turbine by a rotating shaft; and
a housing in which the turbine, the compressor, the rotating shaft, the journal bearing, and the disk member are accommodated.

4. An exhaust turbine turbocharger comprising:
a bearing device according to claim 1;
a turbine;
a compressor coaxially connected to the turbine by a rotating shaft; and
a housing in which the turbine, the compressor, and the rotating shaft, the journal bearing, and the disk member are accommodated.

\* \* \* \* \*